May 8, 1962  R. B. LANDIS, SR  3,033,259
ROD AND REEL CARRYING CASE
Filed Jan. 13, 1960  2 Sheets-Sheet 1
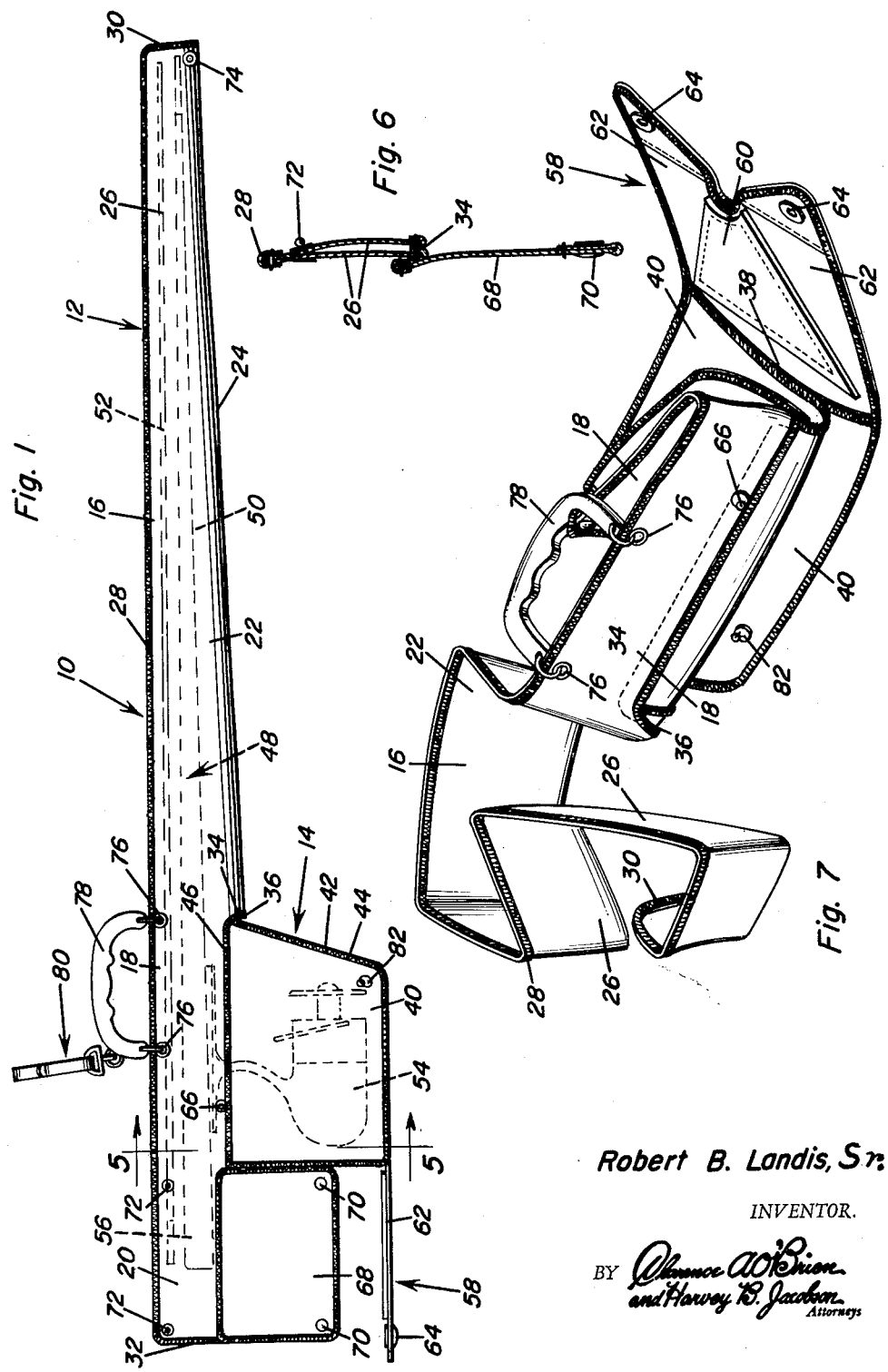
Robert B. Landis, Sr.
INVENTOR.

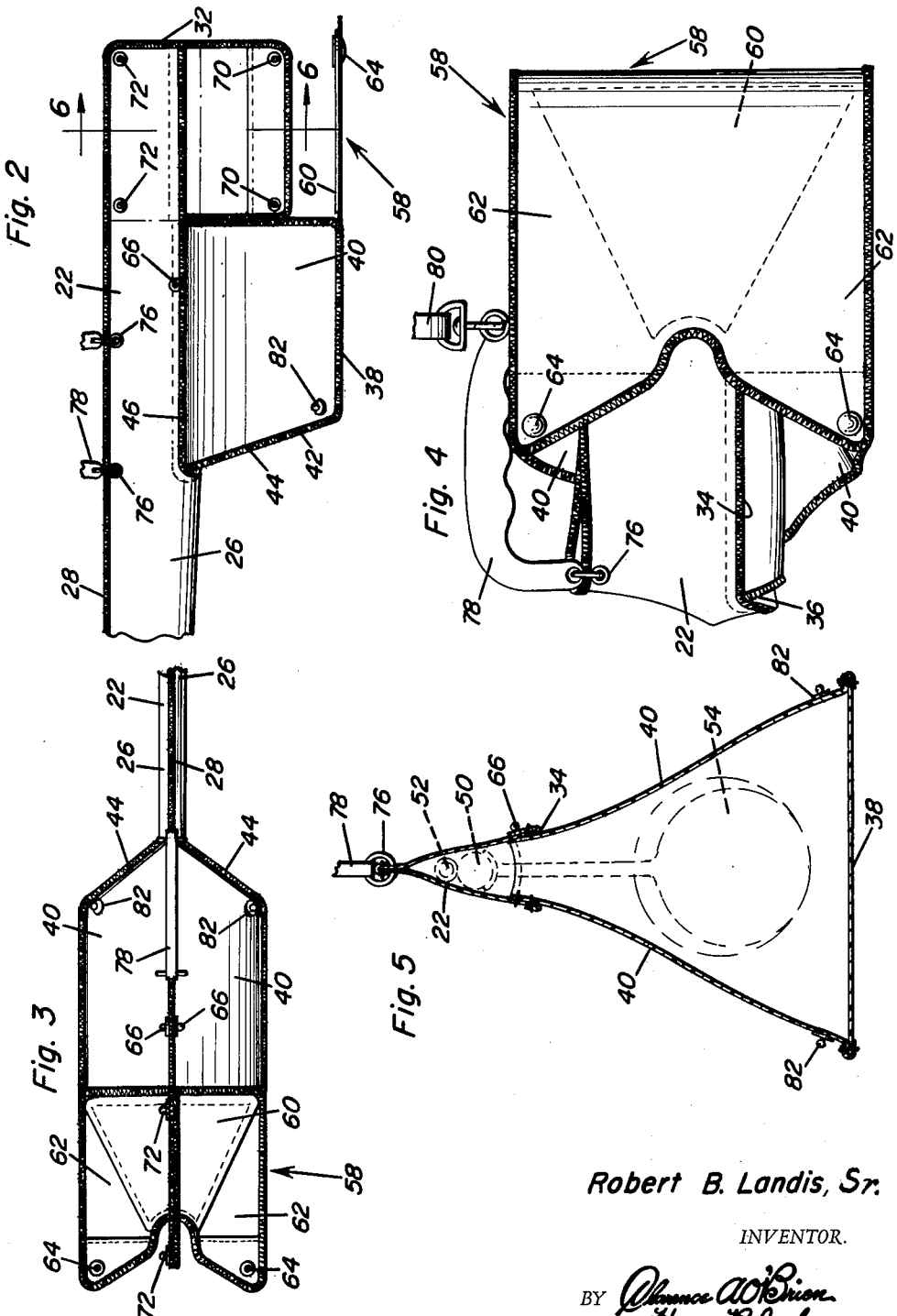

United States Patent Office 3,033,259
Patented May 8, 1962

3,033,259
ROD AND REEL CARRYING CASE
Robert B. Landis, Sr., P.O. Box 74, Linfield, Pa.
Filed Jan. 13, 1960, Ser. No. 2,287
7 Claims. (Cl. 150—52)

This invention relates to a novel and useful rod and reel carrying case, and more particularly to a rod and reel carrying case which is adapted for carrying a fishing rod with its reel and handle attached thereto.

Many of the rod and reel protective carrying cases are for use with fishing rods which may be dismantled. These carrying cases are of the type in which the rod is carried in one case and the reel is carried in another case. If a fishing rod is carried in one case and the reel for the rod is carried in another case, when it is desired to use the rod and reel it is necessary to remove both from their respective cases and then assemble the two so that they may be used. Not only is this time-consuming in preparation for enjoying the sport of fishing, but it is also time-consuming when the fisherman desires to store his equipment for transporting the same from the fishing area.

It is therefore the primary object of this invention to provide a carrying case for a fishing rod with its reel and handle attached thereto so that the fishing rod may be used more quickly when it is desired to do so.

A further object of this invention is to provide an improved rod and reel carrying case that will protect the rod, reel or line from being snagged in weeds and brush or the like while going to and from fishing areas.

Still another object of this invention is to provide a rod and reel carrying case in which a rod with its reel secured thereto may be quickly stored.

A still further object of this invention is to provide a rod and reel carrying case, in accordance with the preceding object, which may be folded into a compact state and conveniently hung from the belt or other piece of clothing worn by a fisherman while he is using the rod and reel so that the case will not be misplaced and will be constantly available to the fisherman for encasing his rod and reel.

A final object to be specifically enumerated herein is to provide a rod and reel carrying case which will conform to conventional forms of manufacture, be of simple construction and easy to use so as to provide a device which will be economically feasible and desirable by substantially every fisherman having a need for its usefulness.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the carrying case with a sectional fishing rod positioned therein with its handle and reel attached thereto;

FIGURE 2 is an enlarged fragmentary side elevational view of the rear portion of the carrying case as seen from a direction directly opposite from that from which the case in FIGURE 1 is viewed;

FIGURE 3 is a top plan view of the case as seen in FIGURE 2;

FIGURE 4 is a side elevational view of the carrying case in a compactly folded position on somewhat an enlarged scale;

FIGURE 5 is a transverse vertical sectional view on somewhat an enlarged scale taken substantially upon the plane indicated by the section line 5—5 of FIGURE 1;

FIGURE 6 is a somewhat enlarged vertical transverse sectional view taken substantially upon the plane indicated by section line 6—6 of FIGURE 2; and FIGURE 7 is a perspective view of the carrying case in a partially folded position.

Referring now more specifically to the drawings the numeral 10 generally designates the rod and reel carrying case comprising the present invention which includes a hollow housing generally designated by the reference numeral 14 which is secured to and depends from a rear portion of the housing 12. The housing 12 includes a forward portion 16, an intermediate portion 18 immediately adjacent the casing 14 and a rear portion 20 disposed rearwardly of the casing 14. The housing 12 is constructed of a single elongated panel 22 of flexible material which is folded along its longitudinal center line 24 to form identical but right and left hand sides 26. The opposite side edges of the elongated panel 22 are connected together by a longitudinal seam 28 which is disposed along the upper surface of the housing 12. The corresponding end edges of the forward end of the housing 12 are secured together by a transverse seam 30 and the corresponding end edges of the rear of the housing 12 are secured together by a transverse seam 32.

The rear portion of the housing 12 has a longitudinally extending opening 34 formed therein extending from and to a point 36 a spaced distance from the rear end of the housing 12.

The casing 14 includes a substantially rectangular bottom panel 38, see FIGURE 5 in particular, and a pair of side panels 40 which are also substantially rectangular and are secured to and extend upwardly from the opposite side edges of the bottom panel 38 and are upwardly convergent. Secured to the forward edge of the bottom panel 38 is a substantially rectangular front panel 42 which extends upwardly therefrom and has its opposite side edges secured to the forward edges of the side panels 40 by means of seams 44. The upper edges of the side panels 40 and the front panel 42 are secured to the edges of the housing 12 defining the opening 34 by any convenient manner such as seams 46. Therefore, the casing 14 has an open top and its upper edges are secured about the edges of the housing 12 defining the forward portion of the opening 34.

With particular attention now directed to FIGURE 1 of the drawings it will be noted that the fishing rod generally designated by the reference numeral 48 including its rod sections 50 and 52 together with its reel 54 and handle 56 may be inserted into the case 10 through the opening 34 formed in the lower rear edges of the housing 12. It is to be noted at this time that the casing 14 is not provided with a rear wall whereby its rear end is open and is adapted to receive the reel 54 upon forward longitudinal movement of the latter relative to the casing 14. However, the casing 14 is provided with a closure panel generally designated by the reference numeral 58 which is generally rectangular and is provided with a substantially triangular stiffener 60 which is of substantially the same dimensions in plan as the front wall 42. The closure panel 58 is secured at its lower edge with the rear edge of the bottom panel 38 and projects upwardly therefrom. The upper corners of the closure panel 58 which extend beyond the apex of the stiffener 60 define locking tabs 62 which each have a female fastener 64 secured thereto which may be removably secured to the male fasteners 66 which are secured to the lower surfaces of the housing 12 adjacent the edges thereof defining the opening 34 a spaced distance forwardly of the rear edges of the side panels 40. Thus, the closure panel 58 may be removably secured in overlying relation to the open end of the casing 14.

It is to be noted that the handle 56 of the fishing rod 48 is received within that portion of the housing 12 disposed behind the casing 14 upon upward movement of the handle 56 through that portion of the opening 34 formed in the housing 12 projecting behind the casing 14.

The closure panel for that portion of the opening 34 disposed behind the casing 14 is generally rectangular in configuration and is indicated by the reference numeral 68. One edge of the closure panel 66 is secured to the housing 12 adjacent one edge of the opening 34 and the opposite edge of the closure panel 68 is provided with female fasteners 70 which may be removably secured to male fasteners 72 secured to the housing 12 on the other side of the opening 34 with the closure panel 68 overlying the immediately adjacent portion of the opening 34. In this manner, the rod 48 may be secured within the carrying case 10.

It will be noted that the forward end of the housing 12 is provided with an eyelet 74 for hanging the case 10 when it is not in use and also that additional eyelets 76 are secured through both the sides 26 of the housing 12 above the casing 14 for securing a handle 78 thereto. A spring clip 80 is also secured to one of the eyelets 76 for a purpose to be hereinafter set forth.

With attention now directed more particularly to FIGURES 4 and 7 of the drawings it will be noted that the case 10 may have its forward portion 16 folded in any convenient manner to directly overlie the intermediate portion 18 thereof with the rear portion 20 also folded over the intermediate portion 18. The casing 14 is then collapsed flat upon its bottom wall 38 with the houisng 12 then folded approximatelly 90° along the seams 46 to overlie the bottom wall 38. The closure panel 58 is then folded back over the folded housing 12 and the female fasteners 64 are removably secured with the male fasteners 82 which are secured to the forward lower corners of the side panels 40. In this manner, the carrying case 10 is compactly folded and it will be noted that the string clip 80 may then be used to suspend the carrying case 10 from the belt or other pieces of clothing of a fisherman after he has removed his fishing rod 48 from the carrying case 10 during the time he is using his fishing rod 48. Therefore, a means is provided for positioning and maintaining the carrying case 10 on a fisherman until such time as he desires to replace his fishing rod within the carrying case 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rod and reel carrying case for enclosing a fishing rod with its reel attached, said case comprising an elongated hollow housing, said housing including a forward portion for receiving the portion of the rod forward of the reel, an intermediate portion for receiving the portion of the rod immediately adjacent the reel, and a rear portion for receiving the handle of the rod disposed behind the reel, said intermediate portion having an opening formed in its lower portion for receiving said reel therethrough, an open top hollow casing for enclosing said reel, the upper edges of said casing secured to the edges of said opening enclosing the latter, said casing being open at its rear end for receiving said reel thereinto upon forward movement of the reel longitudinally of the case, an opening formed in the lower surfaces of said rear portion extending rearwardly therefrom to rear end of said rear portion and forming a continuation of the opening formed in said intermediate portion for receiving said handle upon upward lateral movement of the latter, and closure panels for the rear end of said casing and said opening in said rear portion adapted to be removably secured thereover.

2. A rod and reel carrying case for enclosing a fishing rod with its reel attached, said case comprising an elongated horizontally disposed hollow housing adapted to receive said rod, an opening formed in the lower portion of said housing extending forwardly from and to a point a spaced distance from the rear end of said housing, an open top hollow casing having an open rear end depending from said case and having its upper edges secured to the portions of said housing defining the forward portion of said opening and enclosing that portion of said opening for receiving said reel, whereby the rear end of said rod is receivable in the portion of said housing disposed behind said casing through that portion of the opening formed therein upon upward movement of the rear end of said rod through the rear portion of said opening, and closure panels for the rear of said casing and the rear portion of said opening in said housing adapted to be removably secured thereover.

3. The combination of claim 1 wherein said case is constructed of flexible material.

4. The combination of claim 3 wherein said housing is formed of a single elongated panel folded along its longitudinal center line and having its opposite side edges connected together by a longitudinal seam and its corresponding end edges connected together by transverse seams.

5. The combination of claim 4 wherein said casing includes a substantially rectangular bottom panel, a pair of substantially rectangular opposite side panels secured to and extending upwardly from said bottom panel from opposite side edges thereof with said side panels being upwardly convergent, and a substantially triangular front panel secured to and extending upwardly from the forward edge of said bottom panel, the forward edges of said side panels being secured to the side edges of said front panel.

6. The combination of claim 5 wherein said closure panel for said casing includes a substantially rectangular rear panel having a triangular stiffener therein complementary to said front panel in dimensions secured to and extending upwardly from the rear edge of said bottom panel, the corners of said rear panel projecting beyond said stiffener comprising locking tabs, means for removably securing said locking tabs in overlying relation to the upper rear corners of said side panels.

7. The combination of claim 6 wherein said closure panel for the portion of said opening disposed rearwardly of said casing comprises a closure flap secured along one edge to said housing on one side of said opening, and means for removably securing the opposite edge of said closure flap to said housing on the other side of said opening with said closure flap lying over said opening.

References Cited in the file of this patent
UNITED STATES PATENTS 2,149,087    Fisher                 Feb. 28, 1939
2,723,482    Marten                Nov. 15, 1955